April 17, 1945.    J. J. HARLEY ET AL    2,373,756
RAILWAY TRUCK
Filed Sept. 6, 1941    2 Sheets-Sheet 1
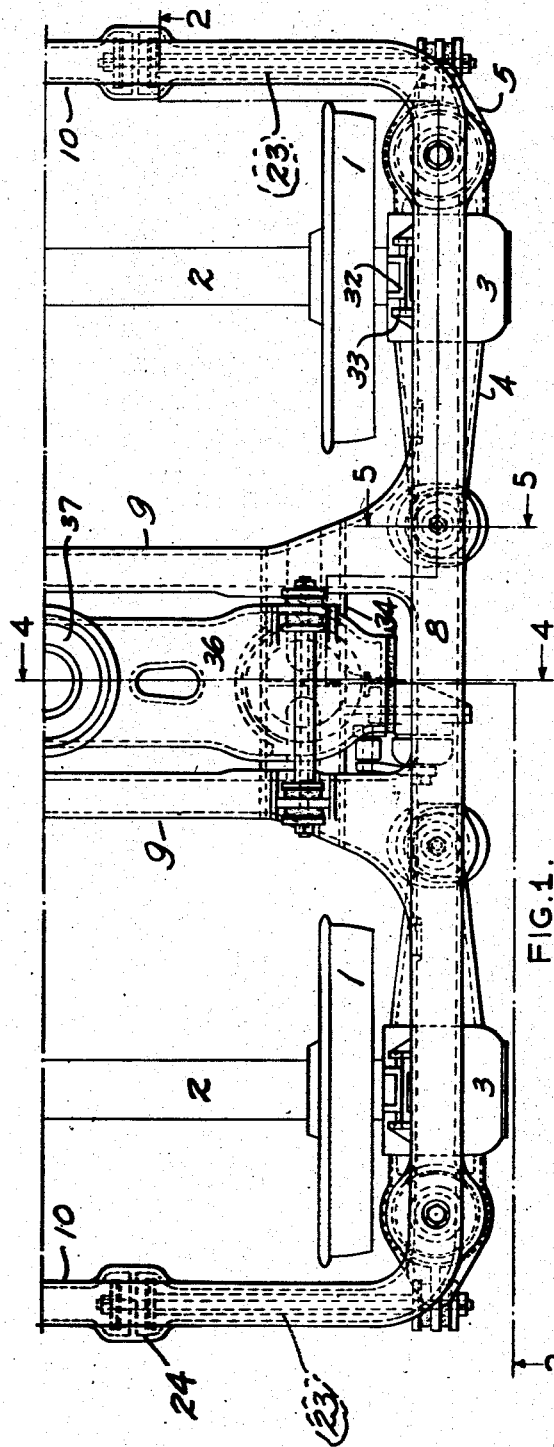
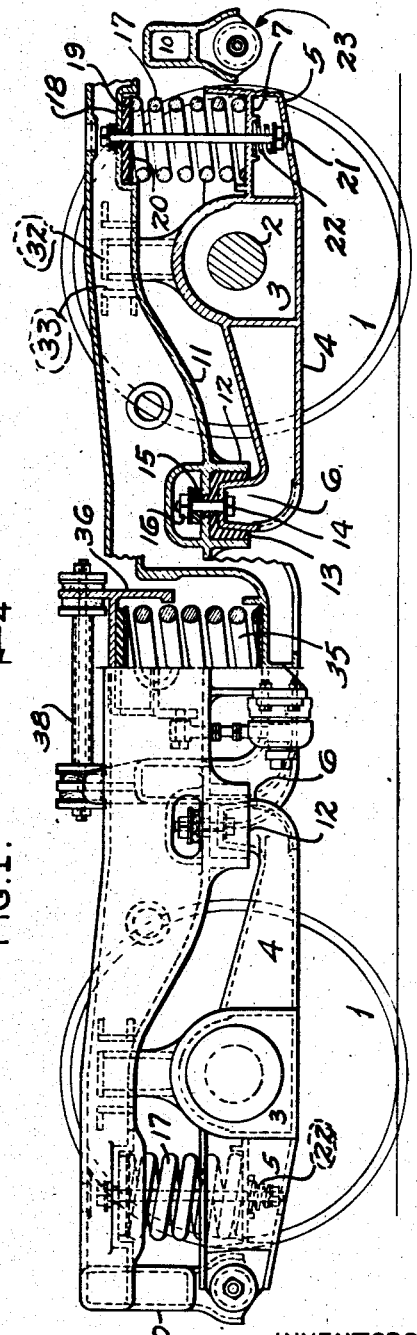
INVENTORS
JOSEPH J. HARLEY
JAMES C. TRAVILLA, JR.
BY Rodney Bedell
ATTORNEY April 17, 1945.  J. J. HARLEY ET AL  2,373,756
RAILWAY TRUCK
Filed Sept. 6, 1941  2 Sheets-Sheet 2

INVENTORS
JOSEPH J. HARLEY
JAMES C. TRAVILLA, JR.
BY Rodney Bedell
ATTORNEY

Patented Apr. 17, 1945

2,373,756

UNITED STATES PATENT OFFICE 2,373,756

RAILWAY TRUCK

Joseph J. Harley, Granite City, Ill., and James C. Travilla, Jr., Philadelphia, Pa., assignors to General Steel Castings Corporation, Granite City, Ill., a corporation of Delaware Application September 6, 1941, Serial No. 409,760

4 Claims. (Cl. 105—218)

The invention relates to trucks for railway rolling stock and more particularly to the supporting of the truck frame from the truck axles.

The main object of the invention is to support the frame from the truck by a yielding device which will avoid direct contact between the axle boxes and the truck frame.

In ordinary truck construction the frame has depending pedestals embracing the journal boxes and limiting the relative movement of the journal boxes and frame longitudinally and transversely of the truck. The retardation and acceleration of the vehicle and the play of the wheels transversely of the track set up numerous shocks which are transmitted to the truck frame and from the latter to the car body, producing rough riding qualities which create wear in the parts and discomfort to the passengers when the truck is used in passenger car equipment.

The present invention contemplates the reduction or elimination of such shocks by the use of a pedestalless type of frame and supporting the frame from the axle boxes by members mounted on the latter and yieldingly secured to the frame at points spaced from the axles.

In the accompanying drawings illustrating a selected embodiment of the invention—

Figure 1 is a top view of one longitudinal half of a four-wheel truck.

Figure 2 is in part a side elevation and in part a longitudinal vertical section through the truck and is taken on the line 2—2 of Figure 1.

Figure 3:
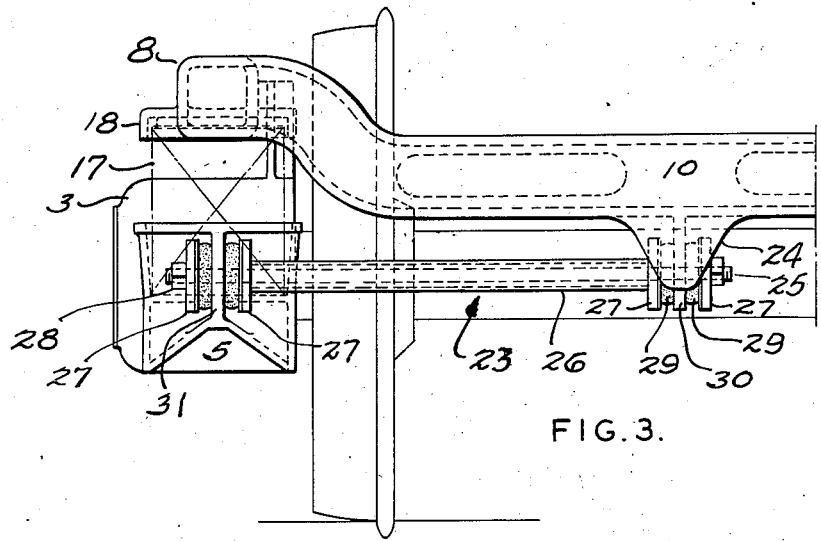
Figure 3 is an end view of the truck structure shown in Figures 1 and 2.
Figure 4:
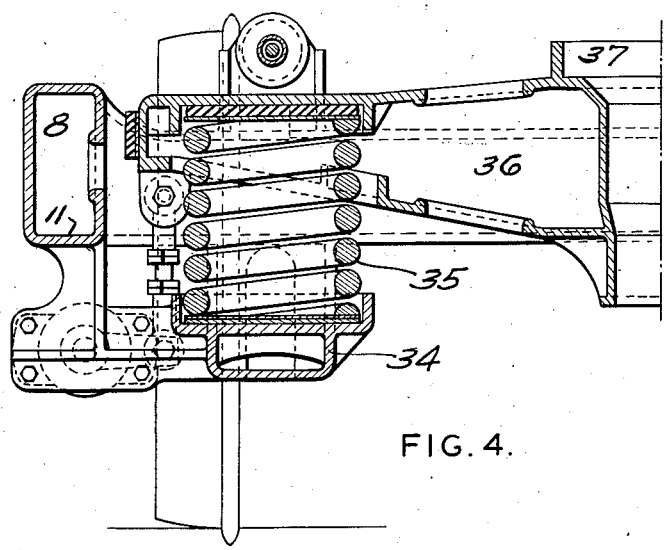
Figures 4 and 5 are vertical transverse sections taken on the corresponding section lines of Figure 1.
Figure 5:
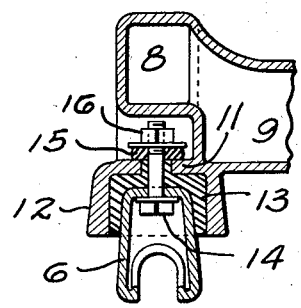

The truck includes the usual wheels 1 and axles 2. Mounted upon each axle journal is a journal box 3 preferably having integral therewith arms 4 and 5 extending longitudinally of the truck, arm 4 terminating in an upwardly projecting boss 6, preferably of circular contour, and arm 5 terminating in an upwardly facing spring seat 7.

A truck frame extends over both axles and includes a wheel piece 8 at each side of the truck in substantial vertical alignment with journal box arms 4 and 5. The frame includes transoms 9 and end rails 10 extending transversely of the truck and connecting wheel pieces 8 at opposite sides of the truck.

Each wheel piece is shown as of box-shaped cross section and its bottom wall 11 is provided with annular ribs 12 each cooperating with the bottom wall to form a downwardly facing cup-like recess adapted to receive one of the upwardly projecting bosses 6 on the adjacent journal box arm 4.

Preferably each recess is provided with a rubber lining 13 fitting over the boss and a vertical bolt 14 extends through the top face of the boss, lining 13, wall 11, and a rubber washer 15 on top of wall 11 and is secured by a nut 16, thus forming a pivotal connection between the frame and the journal box member.

A coil spring 17 carried on seat 7 is received in a suitable cap 18 in the adjacent portion of the frame wheel piece and preferably the cap is provided with a pad 19 of rubber-like material forming a cushion between the frame and the spring. This pad may be faced with a wear plate 20 to avoid abrasion of the rubber pad and provide more even distribution of the spring thrust thereto.

A bolt 21 through wheel piece 8, spring 17 and arm 5 maintains the assembly of these parts, and a supplementary spring 22 holds the bolt against play on the assembly but accommodates the compression and expansion of frame supporting spring 17.

An anchor device 23 extends transversely of the truck between the outer end of each arm 5 and a bracket 24 on the corresponding end rail 10 of the truck frame. This anchor rod includes a bolt 25, a substantially shorter tube 26, opposing discs 27 between each end of tube 26 and the adjacent end of bolt 25, a nut 28 on the adjacent end of the bolt and pads 29 of rubber-like material between each disc 27 and the upright web 30 of bracket 24 or a corresponding web 31 of arm 5.

This construction permits relative movement in vertical directions between the truck frame and the wheels and axles and journal boxes and holds these parts against any substantial movement in transverse and longitudinal directions, all such movements being cushioned to avoid the transmission of shocks between the truck frame and the running gear upon which it is mounted. Relative movement of the truck frame and journal box in horizontal directions is positively limited by opposing lugs 32 and 33 on the frame and box respectively in the event of failure of any of the connected parts.

Cross ties 34 extend between transoms 9 and seat coil springs 35 which mount the truck bolster 36 arranged to support the vehicle body (not shown) through any usual center plate as indicated at 37. Movement of the bolster longitudinally of the truck relative to the truck frame is yieldingly resisted by anchor devices 38 each connected at its ends to suitable brackets on the bolster and truck frame and constructed and functioning similarly to the anchor device 23 previously described. It will be understood that if desired, the bolster may be arranged to move laterally in the truck by providing the well known swing hangers and spring planks instead of supporting the bolster on springs mounted on the frame cross ties 34 or any other bolster lateral motion arrangement may be provided in combination with the new features coming within the scope of the claims.

Those familiar with the art will readily understand that the structure described above provides a simple, effective yielding support for the truck frame on the journal boxes without direct contact between the same. All of the parts are readily accessible for assembly, inspection and replacement.

The details of the construction are susceptible of numerous modifications without departing from the spirit of the invention, and the exclusive use of those modifications coming within the scope of the claims is contemplated.

What is claimed is:

1. In a railway truck, a wheeled axle, a member supported on said axle and extending longitudinally of the truck in opposite directions from said axle, a truck frame extending above said member, said member and frame having cooperating cup-like elements spaced in one direction from said axle longitudinally of the truck and fitting each other with their common axis disposed vertically, and arranged so that the bottoms of said elements provide interengaging substantially flat circular horizontal bottoms to uniformly transmit the vertical forces between them, said elements forming a pivot between said member and frame to accommodate their relative horizontal swinging movement, and means spaced in the opposite direction from said axle and yieldingly supporting said frame from said member and thrusting the cup-like elements towards each other to support the frame from said member.

2. A railway truck as described in claim 1 in which the cup-like elements are provided with an insert of rubber or like material yieldingly resisting and cushioning forces and shocks applied between the adjacent portions of the frame and member.

3. In a railway truck, a wheeled axle, a member supported on said axle and extending longitudinally of the truck in opposite directions from said axle, a truck frame including a wheel piece above and in substantially the same longitudinal plane as said member, said wheel piece having a downwardly facing cup-like recess spaced from said axle, and provided with a lining of rubber-like material, said member having a corresponding upwardly facing projection received in said lined recess, and a spring on said member for supporting said frame wheel piece, the recess and projection having a common vertical axis in said plane.

4. In a railway truck, a wheeled axle, a lever member supported on said axle and extending longitudinally of the truck in opposite directions from said axle, a truck frame including a wheel piece member above and in substantially the same longitudinal plane as said lever member, one of said members having a vertically facing cup-like recess spaced from said axle and provided with a lining of rubber-like material, the other of said members having an oppositely facing projection received in said lined recess, and a spring on said lever member for supporting said wheel piece member, the recess and projection having a common vertical axis in said plane.

JOSEPH J. HARLEY.
JAMES C. TRAVILLA, JR.